(12) United States Patent
Gao et al.

(10) Patent No.: US 10,969,616 B2
(45) Date of Patent: Apr. 6, 2021

(54) DISPLAY MODE CONTROLLING DEVICE, CONTROLLING METHOD THEREOF AND DISPLAY DEVICE

(71) Applicant: BOE TECHNOLOGY GROUP CO., LTD., Beijing (CN)

(72) Inventors: Jian Gao, Beijing (CN); Xiaochuan Chen, Beijing (CN); Yafeng Yang, Beijing (CN); Jifeng Tan, Beijing (CN); Xianqin Meng, Beijing (CN); Pengcheng Lu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 386 days.

(21) Appl. No.: 16/077,427

(22) PCT Filed: Jan. 5, 2018

(86) PCT No.: PCT/CN2018/071474
§ 371 (c)(1),
(2) Date: Aug. 10, 2018

(87) PCT Pub. No.: WO2019/000899
PCT Pub. Date: Jan. 3, 2019

(65) Prior Publication Data
US 2021/0011331 A1 Jan. 14, 2021

(30) Foreign Application Priority Data
Jun. 29, 2017 (CN) .......................... 201710513796.4

(51) Int. Cl.
*G02F 1/1335* (2006.01)
*G02F 1/1343* (2006.01)

(52) U.S. Cl.
CPC ...... *G02F 1/133504* (2013.01); *G02F 1/1343* (2013.01); *G02F 1/133526* (2013.01)

(58) Field of Classification Search
CPC ............. G02F 1/133504; G02F 1/1343; G02F 1/133526
See application file for complete search history.

(56) References Cited

U.S. PATENT DOCUMENTS 6,618,106 B1 9/2003 Gunn et al.
7,388,822 B2 * 6/2008 Ooi .......................... G02F 1/29
369/112.02

(Continued)

FOREIGN PATENT DOCUMENTS

CN        1914674 A     2/2007
CN     102692781 A     9/2012

(Continued)

OTHER PUBLICATIONS

Chinese Office Action dated Aug. 29, 2019, from application No. 201710513796.4.

(Continued)

*Primary Examiner* — Donald L Raleigh
(74) *Attorney, Agent, or Firm* — Arch & Lake LLP

(57) ABSTRACT

The present disclosure relates to a display mode controlling device, a controlling method thereof and a display device. The display mode controlling device includes: a first substrate including a plurality of lens units arranged in an array, each of the lens units is provided with an annular diffractive phase grating; a second substrate aligned with the first substrate; a liquid crystal (LC) layer located between the first substrate and the second substrate; and a control electrode configured to generate a predetermined electric field to control a deflection state of a LC molecule.

19 Claims, 4 Drawing Sheets

(56) References Cited

U.S. PATENT DOCUMENTS

| | | | |
|---|---|---|---|
| 2004/0108984 A1* | 6/2004 | Ogasawara | G11B 7/13927 |
| | | | 345/87 |
| 2006/0280100 A1 | 12/2006 | Ooi et al. | |
| 2013/0222756 A1 | 8/2013 | Van Heugten | |
| 2015/0192781 A1 | 7/2015 | Lee | |

FOREIGN PATENT DOCUMENTS

| | | | | |
|---|---|---|---|---|
| CN | 105607172 | | 5/2016 | |
| CN | 105866998 A | | 8/2016 | |
| CN | 105867044 | | 8/2016 | |
| CN | 105867044 A | * | 8/2016 | G02F 1/29 |
| CN | 107329309 | | 11/2017 | |
| EP | 1 713 067 A1 | | 10/2006 | |
| JP | 2006-071799 A | | 3/2006 | |
| KR | 20150081102 A | | 7/2015 | |
| WO | WO-2017/166427 A1 | | 10/2017 | |
| WO | WO-2017/215272 A1 | | 12/2017 | |

OTHER PUBLICATIONS

International Search Report and Written Opinion dated Mar. 30, 2018, from application No. PCT/CN2018/071474.

* cited by examiner

DISPLAY MODE CONTROLLING DEVICE, CONTROLLING METHOD THEREOF AND DISPLAY DEVICE

CROSS REFERENCE

The present application is a continuing application of International Application No. PCT/CN2018/071474, filed on Jan. 5, 2018, which is based upon and claims priority to Chinese Patent Application No. 201710513796.4, filed on Jun. 29, 2017, and the entire contents thereof are incorporated herein by reference.

TECHNICAL FIELD

The present disclosure relates to the field of display technology, and particularly to a display mode controlling device, a controlling method thereof and a display device.

BACKGROUND

A conventional flat-panel display device is advantageous in smaller thickness and weight and a saved physical space, and has been widely used in the field of display. However, a light distribution property of the flat-panel display device leads to that a light intensity is progressively weakened with the increase of a viewing distance, from a position directly facing human eyes towards both sides of the displayer, which results in a poor visual experience of a user. Such situation is especially worse for large-scaled flat-panel display devices.

A surrounding-like effect of a curved display can enhance a visual effect experienced by the user so as to provide the user with better visual experience. However, a defect of the curved display lies in that, physically bending a curved display device involves relatively greater engineering difficulty, and easily results in a display anomaly due to uneven thickness. Moreover, the device is usually thicker and heavy.

Therefore, a display device with improved user experience will be provided, if the advantages of smaller thickness and weight of the flat-panel display device could be effectively combined with the visual effect of the curved display device.

It should be understood that, the information disclosed in the background part above is only provided to facilitate understanding of the background of the present disclosure, and may include information which doesn't constitute existing technology well-known for those ordinary skilled in the art.

SUMMARY

According to some arrangements of the present disclosure, it provides a display mode controlling device for switching between a planar display mode and a virtual curved display mode of a display panel, the display mode controlling device includes a first substrate including a plurality of lens units arranged in an array, each of the lens units is provided with an annular diffractive phase grating, a second substrate aligned with the first substrate, a liquid crystal (LC) layer located between the first substrate and the second substrate, and a control electrode configured to generate a predetermined electric field to control a deflection state of a LC molecule.

In an illustrative example of the present disclosure, each of the lens units is corresponding to one pixel region of the display panel.

In an illustrative example of the present disclosure, focal distances of respective lens units corresponding to different pixel regions of the display panel are progressively increased from a center to an edge of the first substrate.

In an illustrative example of the present disclosure, each of the lens units is corresponding to one sub-pixel region of the display panel.

In an illustrative example of the present disclosure, focal distances of respective lens units corresponding to different pixel regions of the display panel are progressively increased from a center to an edge of the first substrate, and focal distances of lens units corresponding to different sub-pixel regions of a same pixel region are the same.

In an illustrative example of the present disclosure, under the virtual curved display mode, a trace of image distances of all the lens units is arranged in a curved surface.

In an illustrative example of the present disclosure, the first substrate includes a base substrate, and the annular diffractive phase grating is formed integrally with the base substrate.

In an illustrative example of the present disclosure, the annular diffractive phase grating includes N steps, and adjacent steps have a phase difference of $2\pi/N$. $N=2^m$, and m is a positive integer.

In an illustrative example of the present disclosure, each of the steps has a height $$h = \frac{\lambda/N}{n - n_o},$$

and each of the steps has a width $$t_j = \begin{cases} \dfrac{d_j}{N/2}, & (j \text{ is an even number}) \\ d_j - \sum_{i=1}^{m-1} \dfrac{d_{j+1}}{2^i}, & (j \text{ is an odd number}) \end{cases},$$

where $\lambda$ is a wavelength of emergent light of the display panel, n is a refractivity of the first substrate, $n_o$ is a minimum refractivity of the LC molecule with respect to the emergent light of the display panel, j is a number of Fresnel wave band, d is a width of Fresnel wave band, and i is a positive integer.

In an illustrative example of the present disclosure, the LC molecule has a first refractivity with respect to emergent light of the display panel under a first deflection state and has a second refractivity with respect to emergent light of the display panel under a second deflection state. The first refractivity of the LC molecule is as same as a refractivity of the first substrate and is as same as a refractivity of the second substrate.

In an illustrative example of the present disclosure, a direction of major axis of the LC molecule under an initial alignment is perpendicular to a polarization direction of the emergent light of the display panel, or, a direction of major axis of the LC molecule under an initial alignment is parallel to a polarization direction of the emergent light of the display panel.

In an illustrative example of the present disclosure, the control electrode includes a first electrode and a second electrode, the first electrode and the second electrode both are disposed on the second substrate. The first electrode and the second electrode are located at different layers, the first electrode is a plate electrode and the second electrode is a strip electrode, or, the first electrode and the second electrode are located at a same layer, the first electrode and the second electrode both are a strip electrode and are disposed alternately.

According to some arrangements of the present disclosure, it provides a display device, including a display panel, a display mode controlling device described above, and a control module, the control module is configured to power on the display mode controlling device so as to allow the display panel to present a planar display mode, and to power off the display mode controlling device so as to allow the display panel to present a virtual curved display mode.

According to some arrangements of the present disclosure, it provides a display mode controlling method for switching a display mode of the above-mentioned display device, the display mode controlling method includes: by powering on the control electrode, allowing the LC molecule to be in a first deflection state so as to present the planar display mode, and by powering off the control electrode, allowing the LC molecule to be in a second deflection state so as to present the virtual curved display mode.

BRIEF DESCRIPTION OF THE DRAWINGS

Herein the drawings that are incorporated into the description and constitute a part of the present description illustrate arrangements in accordance with the present disclosure, and are used for explaining principle(s) of the present disclosure together with the description. Obviously, the described drawings in the following merely are some arrangements of the present disclosure, from which other figures can be derived without any creative works for those ordinary skilled in the art.

REFERENCE NUMERALS

110—display mode controlling device; 120—display panel; 100—lens unit; 210—first substrate; 220—second substrate; 230—LC layer; 240—control electrode; 241—first electrode; 242—second electrode; 300—annular diffractive phase grating.

DETAILED DESCRIPTION

In order to make objects, technical solutions and advantages of the arrangements of the present disclosure apparent, the technical solutions of the arrangements will be described in a clearly and fully understandable way in connection with the drawings related to the arrangements of the invention. Apparently, the described arrangements are just a part but not all of the arrangements of the present disclosure. Based on the described arrangements herein, those skilled in the art can obtain other arrangement(s), without any inventive work, which should be within the scope of the present disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
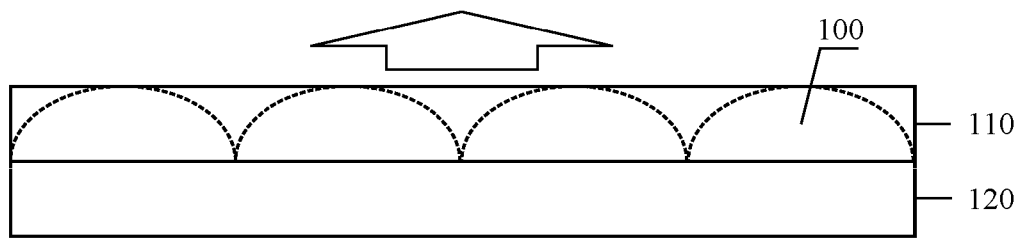
FIG. 1 is a schematic diagram illustrating relative positions of a display mode controlling device and a display panel in an illustrative arrangement of the present disclosure.

The present illustrative arrangement provides a display mode controlling device for switching between a planar display mode and a virtual curved display mode of a display panel. FIG. 1 is a schematic diagram illustrating relative positions of a display mode controlling device 110 and a display panel 120. The display mode controlling device 110 can be disposed at a light emergent side of the display panel 120 to control a refractive state of emergent light of the display panel 120.

The display mode controlling device 110 can include a plurality of lens units 100 arranged in an array, and each of the lens units 100 is corresponding to one sub-pixel or one pixel of the display panel 120. Of course, each of the lens unit 100 can also be corresponding to a plurality of sub-pixels of the display panel 120. A corresponding relationship between the lens unit 100 and the sub-pixel is not particularly limited herein.

The display panel 120 can be any one of a liquid crystal display (LCD) panel, an organic light-emitting diode (OLED) display panel, a polymer light-emitting diode (PLED) display panel and a plasma display panel. A particular type of the display panel is not limited in the present arrangement.

Figure 2:
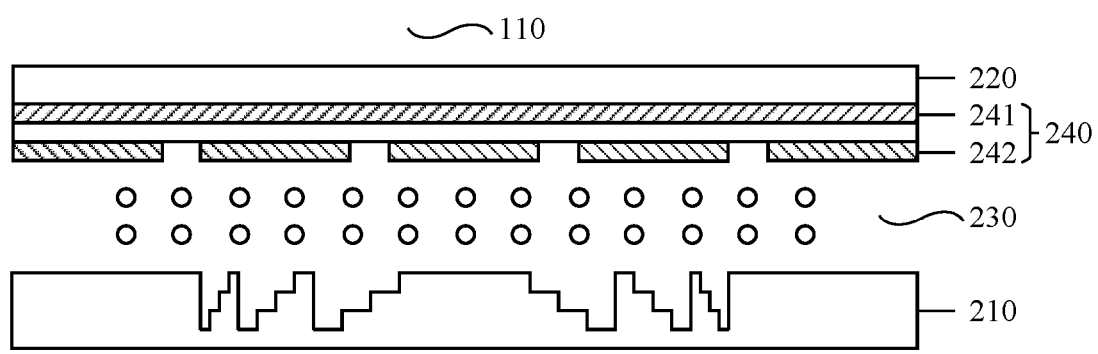
FIG. 2 is a schematic diagram illustrating a structure of a display mode controlling device in an illustrative arrangement of the present disclosure.

As illustrated in FIG. 2, the display mode controlling device 110 can include: a first substrate 210 and a second substrate 220 which are disposed to be opposite to each other; a LC layer 230 located between the first substrate 210 and the second substrate 220; and a control electrode 240 configured to generate a predetermined electric field so as to control a deflection state of a LC molecule in the LC layer 230.

In the present illustrative arrangement, the control electrode 240 can include a first electrode 241 and a second electrode 242. The first electrode 241 and the second electrode 242 both are a transparent electrode. Both of the first electrode 241 and the second electrode 242 can be disposed on the first substrate 210; or both of the first electrode 241 and the second electrode 242 can be disposed on the second substrate 220; of course, it's also possible that one of the the first electrode 241 and the second electrode 242 is disposed on the first substrate 210 and the other one is disposed on the second substrate 220.

Figure 3:
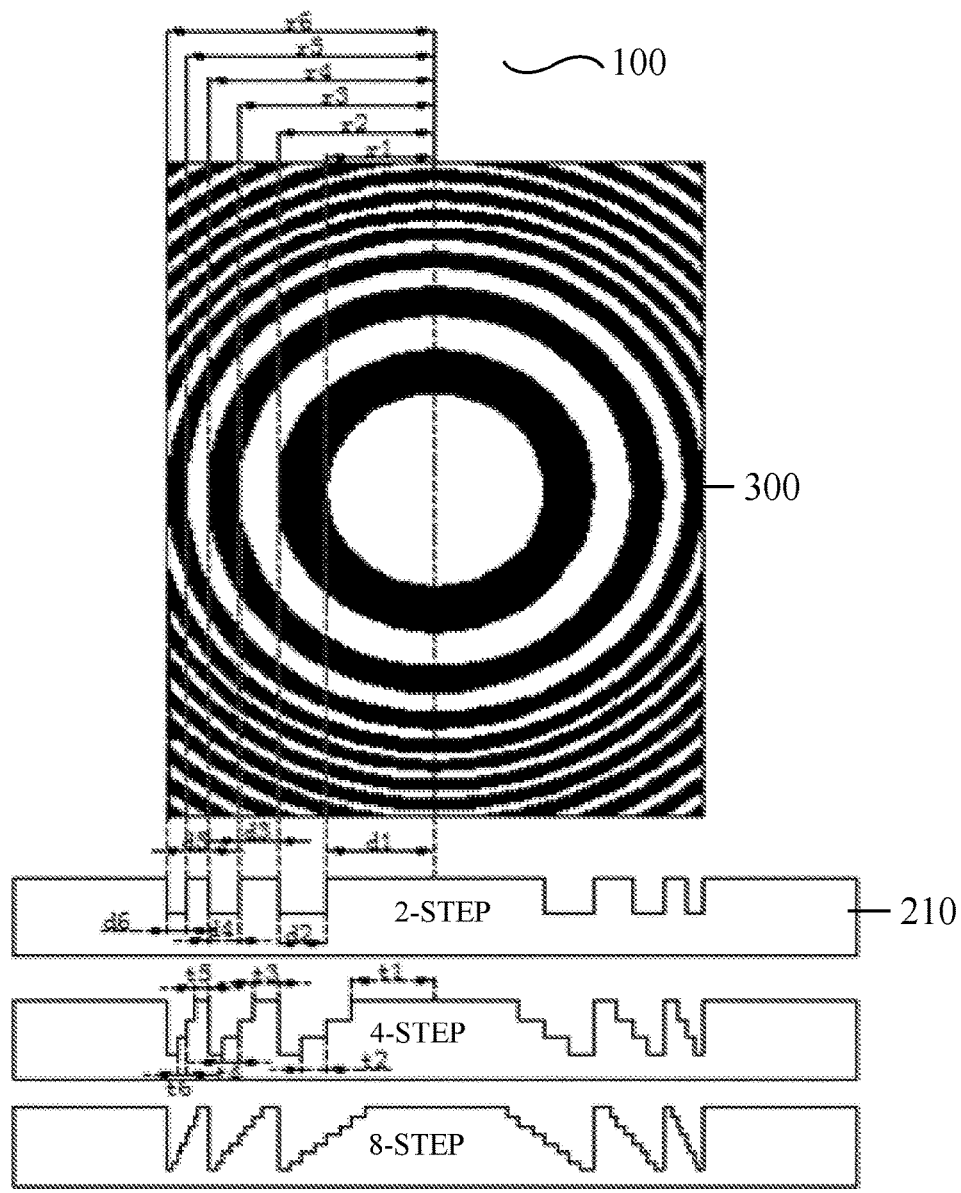
FIG. 3 is a schematic diagram illustrating a structure of a diffractive phase grating in an illustrative arrangement of the present disclosure.

As illustrated in FIG. 3, in each of the lens units 100, a surface of the first substrate 210 can be provided with an annular diffractive phase grating 300, and LC molecules of the LC layer 230 can be filled into a channel of the annular diffractive phase grating 300.

It should be explained that, in order to guarantee a light-emitting effect of the display panel, both of the first substrate 210 and the second substrate 220 should adopt a transparent substrate such as a glass substrate.

The display mode controlling device 110 provided by the present illustrative arrangement, essentially, is a LC cell device, and a substrate surface of the LC cell device is provided with an annular diffractive phase grating 300. When it needs to realize a planar display, the LC molecule in the LC layer 230 can be controlled to present a first deflection state where the LC molecule and the annular diffractive phase grating 300 can constitute a flat glass so as to achieve the planar display; when it needs to realize a virtual curved display, the LC molecule in the LC layer 230 can be controlled to present a second deflection state where the LC molecule and the annular diffractive phase grating 300 can constitute a diffractive lens array; Based on the above, a trace of image distances of display images is arranged in a curved surface by controlling focus distances of respective lens units 100 to be progressively increased from a center towards both sides, so as to achieve an effect of virtual curved display based on a flat-panel display device. In this way, by providing different, predetermined, electric fields through the control electrode 240 to allow the LC molecule to present different deflection states, switching between the planar display mode and the virtual curved display mode can be achieved.

As it can be seen from the description above, the virtual curved display mode in the present illustrative arrangement is a kind of virtual, curved display effect; that is, a display assembly constituted by a conventional display panel 120 and the above-mentioned display mode controlling device 110 is still a flat-panel display device which, however, presents a curved-surface effect for human eyes. In this way, the display device provided by the present illustrative arrangement cannot only avoid physical bending and reduce a processing difficulty but also can effectively save an occupied space; furthermore, a surrounding-like effect produced by the curved display can be obtained, so as to provide the users with better visual experience.

In order to achieve the above-mentioned diffractive lens array, the first substrate 210 can include a base substrate such as a glass substrate, and the annular diffractive lens grating 300 can be integrally formed with the base substrate. In other words, the annular diffractive lens grating 300 having a periodic structure can be directly formed on a surface of the base substrate of the first substrate 210 by an etching process, so that the first substrate 210 constitutes a diffractive lens array.

It should be explained that, apart from the base substrate, the first substrate 210 can further include a thin film layer located at the surface of the base substrate; and the annular diffractive lens grating 300 can be formed in the thin film layer at the surface of the base substrate.

A method of forming the annular diffractive lens grating 300 is not particularly limited in the present arrangement, as long as it can obtain the annular diffractive lens grating. However, considering a degree of complexity of a manufacturing method, the annular diffractive lens grating 300 herein is preferably formed by directing etching a surface of a glass substrate.

Based on the above, a specific structure of the annular diffractive lens grating 300 in each of the lens units 100 can refer to FIG. 3, and can include for example $N=2^m$ steps in which adjacent steps can have a phase difference of $2\pi/N$, wherein m is a positive integer.

Each of the steps has a height which can be expressed as:

$$h = \frac{\lambda/N}{n - n_o} \quad (1)$$

wherein $\lambda$ is a wavelength of emergent light of the display panel, n is a refractivity of the first substrate, and $n_o$ is a minimum refractivity of the LC molecule with respect to the emergent light of the display panel.

Further, widths of steps of the annular diffractive lens grating are distributed in an inner sparse outer dense manner, and are correlated with a width distribution of Fresnel zone. When $N=2$ (m=1), a width distribution of the steps is as same as the width distribution of the Fresnel zone.

Given that a width of Fresnel zone is $d_j$, then $$d_j = r_j - r_{j-1}, \quad (2)$$

$$r_j = \left[\left(-f + \frac{j\lambda/2}{n_1}\right)^2 - f^2\right]^{1/2} = \sqrt{\frac{-jf\lambda}{n_1}} \left(1 - \frac{j\lambda}{4n_1 f}\right)^{1/2}, \quad (3)$$

wherein j is the number of Fresnel zone, $r_j$ is a radius of Fresnel zone, f is a focal distance of object space, and $n_1$ is a refractivity of a medium of object space of the lens array substrate.

Given that a step width of the annular diffractive phase grating is $t_j$, the step width is correlated with whether a cylinder number of Fresnel zone is an odd number or an even number. That is, each of the steps has a width which can be expressed as:

$$t_j = \begin{cases} \dfrac{d_j}{N/2}, & (j \text{ is an even number}) \\ d_j - \sum_{i=1}^{m-1} \dfrac{d_{j+1}}{2^i}, & (j \text{ is an odd number}) \end{cases} \quad (4)$$

wherein i is a positive integer.

Specific structural parameters of the annular diffractive phase grating 300 in each of the lens units 100 are listed above. In the above-mentioned formula (4), when the number j of Fresnel zone values an even number, there are (N−1)

steps having a same width $t_j$; when the number j of Fresnel zone values an odd number, there are only one step having a width $t_j$.

In the present illustrative arrangement, after forming the above-mentioned annular diffractive phase grating 300 on each of the lens units 100, LC molecules can be filled into a channel of the annular diffractive phase grating 300, and the first substrate 210 can be aligned with the second substrate 220 so as to form the display mode controlling device 110. Based on the above, a distribution manner of the predetermined electric field generated by the display mode controlling device 110 is correlated with an arrangement manner of the control electrode 240.

Considering a degree of difficulty of the manufacturing method and because the annular diffractive phase grating 300 is disposed on the first substrate 210, the control electrode 240 is preferably disposed on the second substrate 220. The first electrode 241 and the second substrate 242 can be disposed at different layers, and the first electrode 241 can be a plate electrode while the second electrode 242 can be a strip electrode; In such a case, the electric field as generated is a multi-dimensional electric field. Alternatively, the first electrode 241 and the second electrode 242 can also be disposed at a same layer, and the first electrode 241 and the second electrode 242 can both be a strip electrode and are alternately disposed; In such a case, the electric field as generated is a horizontal electric field. Of course, an insulating layer is further disposed between the first electrode 241 and the second electrode 242, and the insulating layer can adopt a transparent material such as any one or more of silicon nitride, silicon oxide and silicon oxynitride.

It should be explained that, although the control electrode 240 in the present arrangement is preferably disposed on the second substrate 220, the arrangement manner of the electrode is not intended to be limited thereto. The present arrangement merely requires that the control electrode 240 can generate a predetermined electric field to control the LC molecule to deflect, without limiting a particular position or an arrangement manner thereof Because a deflection state of the LC molecule is determined by the predetermined electric field and because the technical solution of the present arrangement merely requires the LC molecule to present two deflection states so that a function of the display mode controlling device 110 can be equivalent to a flat glass and a diffractive lens array, respectively, the present arrangement can achieve the above-mentioned two deflection states by powering on and powering off the control electrode 240, and can allow the LC molecule to have a relatively greater, first refractivity $n_e$ under the first deflection state and to have a relatively smaller, second refractivity $n_o$ under the second deflection state.

Based on the above, in order to guarantee that the display mode controlling device 110 can function as a flat glass under the planar display mode, it further requires the first refractivity $n_e$ of the LC molecule to be as same as a refractivity of the first substrate 210 and a refractivity of the second substrate 220.

In this way, when it needs to realize the planar display, the first electrode 241 and the second electrode 242 can be applied with a voltage, respectively, to allow the LC molecule in the LC layer 230 to present the first deflection state where the LC molecule has a greater first refractivity $n_e$ with respect to the emergent light of the display panel 120; In such a case, because the first refractivity $n_e$ is as same as the refractivity of the first substrate 210 and the refractivity of the second substrate 220, the effect of the display mode controlling device 110 is equivalent to that of a flat glass, and a refractive state of the emergent light of the display panel 120 is not affected.

When it needs to realize the virtual curved display, the first electrode 241 and the second electrode 242 are not applied with any voltage so that the LC molecule in the LC layer 230 present the second deflection state where the LC molecule has a smaller second refractivity $n_o$ with respect to the emergent light of the display panel 120; In such a case, by controlling focal distances of respective lens units 100 to be progressively increased from a center towards both sides, the effect of the display mode controlling device 110 is equivalent to that of a refraction lens array so that a trace of image distances of the emergent light of the display panel 120 upon refraction is arranged in a curved surface.

Figure 4:
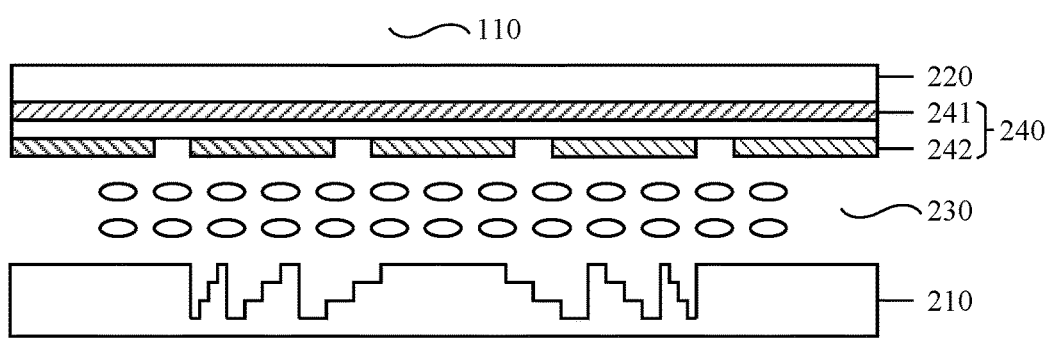
FIG. 4 is another schematic diagram illustrating a structure of a display mode controlling device in an illustrative arrangement of the present disclosure.

Hereinafter an arrangement manner of the display mode controlling device 110 is described in conjunction with FIG. 2 and FIG. 4 by way of example. The display mode controlling device 110 can be disposed at a light emergent side of the LCD panel, and a direction (a direction inwardly perpendicular to a principal plane of FIG. 2) of major axis of the LC molecule in the display mode controlling device 110 under an initial alignment is perpendicular to a polarization direction (i.e., a direction of light-transmittance axis of a polarioid at the light emergent side of the LCD display panel) of the emergent light of the display panel 120.

When a plate-like, first electrode 241 and a strip-like, second electrode 242 are applied with different voltages, respectively, a predetermined electric field can be generated between the two electrodes. As illustrated in FIG. 4, the direction of major axis of the LC molecule in the LC layer 100 will be converted from a direction inwardly perpendicular to the principal plane into a direction parallel to the principal plane and the substrate surface, that is, the direction of major axis of the LC molecule is parallel to the polarization direction of the emergent light of the display panel 120; In such a case, the LC molecule has the first refractivity $n_e$ with respect to the polarized light entering the display mode controlling device 110, and the first refractivity $n_e$ is as same as the refractivity of each of the upper and lower substrate, so that the display mode controlling device 110 is equivalent to a flat glass.

When the plate-like, first electrode 241 and the strip-like, second electrode 242 are not applied with any voltage, no electric field is generated between the two electrodes. As illustrated in FIG. 2, the direction of major axis of the LC molecule is still the one under initial alignment (i.e., a direction inwardly perpendicular to the principal plane); In such a case, the LC molecule has the second refractivity $n_o$ with respect to the polarized light entering the display mode controlling device 110 so that the display mode controlling device 110 is equivalent to a refraction lens array.

Of course, the direction of major axis of the LC molecule under initial alignment can also be parallel to the polarization direction of the emergent light of the display panel 120; In such a case, it only needs to change a power supply mode of the electrode according to the deflection state of the LC molecule.

It should be explained that, in the present arrangement, under some circumstances, it's also possible that the LC molecule is not initially aligned, depending on a shape of the LC molecule; for example, a blue phase LC molecule has an initial state of spherical shape, and hence doesn't need to be initially aligned.

Figure 5:
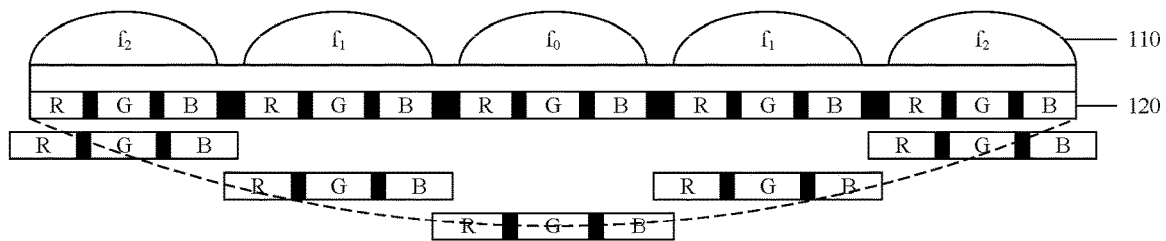
FIG. 5 is a schematic diagram illustrating a state of virtual curved display of a display device in an illustrative arrangement of the present disclosure.

Based on the above, when the display mode controlling device 110 is combined with the display panel 120, as illustrated in FIG. 5, each of the lens units 100 can be corresponding to one pixel region in the display panel 100, for example, a pixel region constituted by a red sub-pixel R, a green sub-pixel G and a blue sub-pixel B. In such a case, by configuring the focal distances of respective lens units 100 to be varied according to a certain rule to allow images formed by respective pixels to be post-positioned and allow the trace of object distances of the images to be arranged in a curved surface, so as to achieve an effect of virtual curved display.

Figure 6:
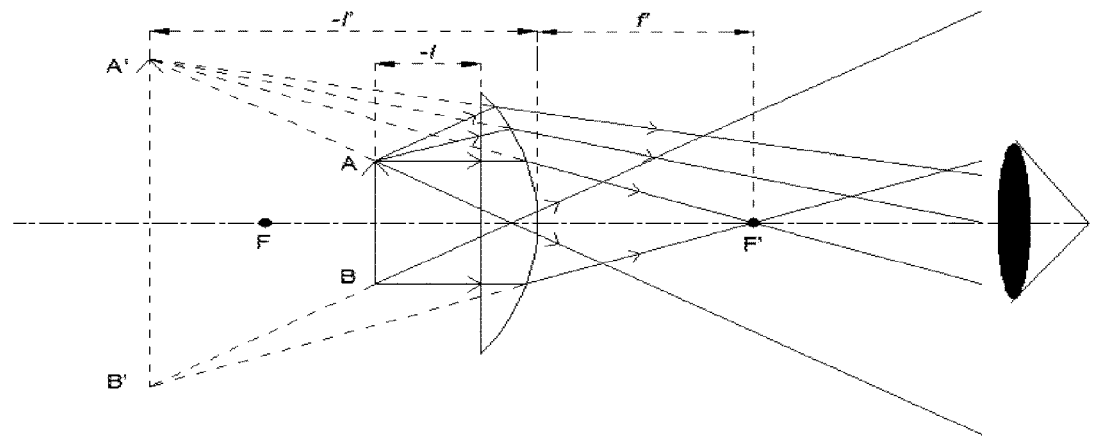
FIG. 6 is a schematic diagram illustrating an image-forming principle of a lens in an illustrative arrangement of the present disclosure.

The diffractive lens unit for achieving virtual curved display is based on the following design principle: a positive lens displays an amplified virtual image based on the principle illustrated in FIG. 6, that is, by placing an object AB right in front of a lens and allowing an object distance to be smaller than a focal distance, an amplified virtual image A'B' of the object AB can be formed and received by human eyes. Optical formulas related with such design principle are listed as below:

an object-image relationship can be expressed as $$\frac{f'}{l'} + \frac{f}{l} = 1, \quad (5)$$

$$\frac{f'}{f} = -\frac{n'_1}{n_1}, \quad (6)$$

an amplification factor of vertical axis can be expressed as $$\beta = \frac{n_1 l'}{n'_1 l}, \quad (7)$$

wherein l is an object distance (negative value), l' is an image distance (negative value), f is a focal distance (negative value) of an object space of the diffractive lens, f' is a focal distance (negative value) of an image space of the diffractive lens, $n_1$ is a refractivity of a medium in the object space of the diffractive lens unit, and $n_1'$ is a refractivity of a medium in the image space of the diffractive lens unit.

Thus it can be seen, if the object distance is constant, then different focal distances are corresponding to different image distances l'. Based on the above, the focal distance |f| of the lens unit 100 can be greater than the object distance |l|, and the focal distances |f| of respective lens units 100 in the diffractive lens array can be symmetrically distributed about a center of the display panel as an axis, with focal distances at the center being smaller and focal distances at both sides being greater, and each of the lens units 100 is corresponding to one pixel region in the display panel; in this way, a display effect in which images are formed to be post-positioned and the trance of space distances of the images is arranged in a curved surface, as illustrated in FIG. 5, can be achieved, i.e., an effect of virtual curved display of a flat-panel display can be achieved.

It should be noted that, although an effect of virtual curved display can be achieved by the arrangements above, amplified images formed by respective pixels would be overlapped with each other to result in a fuzzy display at an image edge, which affects a display quality.

Figure 7:
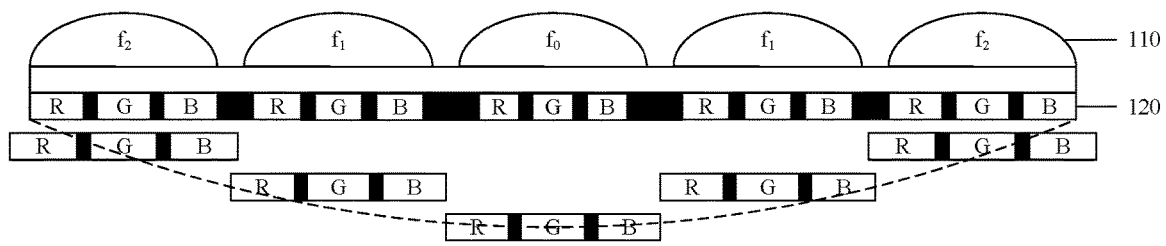
FIG. 7 is a schematic diagram illustrating another state of virtual curved display of a display device in an illustrative arrangement of the present disclosure.

In a first optimum solution, as illustrated in FIG. 7, the above-mentioned problem can be solved by controlling an aperture ratio of the pixel. Because the image formed at the center has a greater amplification factor while the image formed at the edge has a smaller amplification factor, it's possible to allow the aperture ratio of the pixel at a central region of the display panel 120 to be smaller and allow the aperture ratio of the pixel at an edge region of the display panel 120 to be greater so as to control an overlapped area of the image formed at the central region to be smaller than an overlapped area of the image formed at the edge region, so that an overlapped area of amplified images formed by each of the pixels is reduced as far as possible, which can effectively mitigate the issue that the image at a pixel boundary is fuzzy and hence can improve the effect of virtual curved display and increase an image quality. However, the solution, to some extent, reduces the aperture ratio, and hence may affect a lighting effect.

Figure 8:
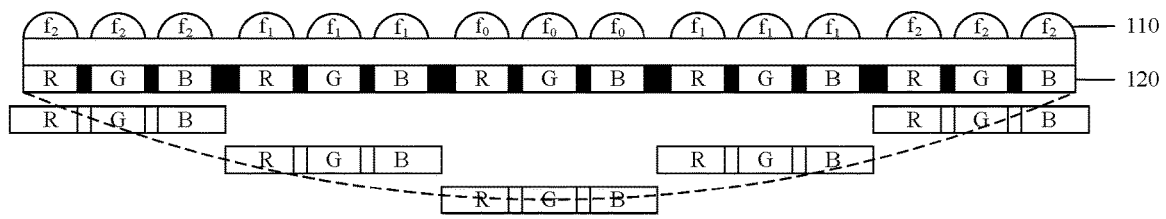
FIG. 8 is a schematic diagram illustrating yet another state of virtual curved display of a display device in an illustrative arrangement of the present disclosure.

In a second optimum solution, as illustrated in FIG. 8, each of the lens units 100 can be corresponding to one sub-pixel region in the display panel 120, e.g., a red sub-pixel R, a green sub-pixel G or a blue sub-pixel B. In such a case, by controlling the focal distances of different pixels to be symmetrically distributed about a center of the display panel 120 as an axis, with focal distances at the center being smaller while focal distances at the edge being greater, and by allowing the focal distances of respective sub-pixels in a same pixel to be identical with each other, an overlap will not be occurred between images formed by different pixels and the issue of fuzzy image at pixel boundary can be removed, so as to improve the effect of virtual curved display. Moreover, an overlap between images formed by different sub-pixels in a same pixel would not affect the displayed image but can facilitate color modulating for improving the image quality.

Further, in the preceding arrangements, it also needs to design a position relationship between a central axis of the diffractive lens unit and a central axis of each corresponding pixel or sub-pixel so that the human eyes at a location having an optimum viewing distance can observe the entire image under virtual curved display. Hereinafter an aperture p of the diffractive lens unit and a deviation value $h_k$ of a central axis of the diffractive lens with respect to a central axis of each corresponding sub-pixel will be defined in conjunction with a viewing distance L, a magnitude t of the sub-pixel and the number of the sub-pixel.

Figure 9:
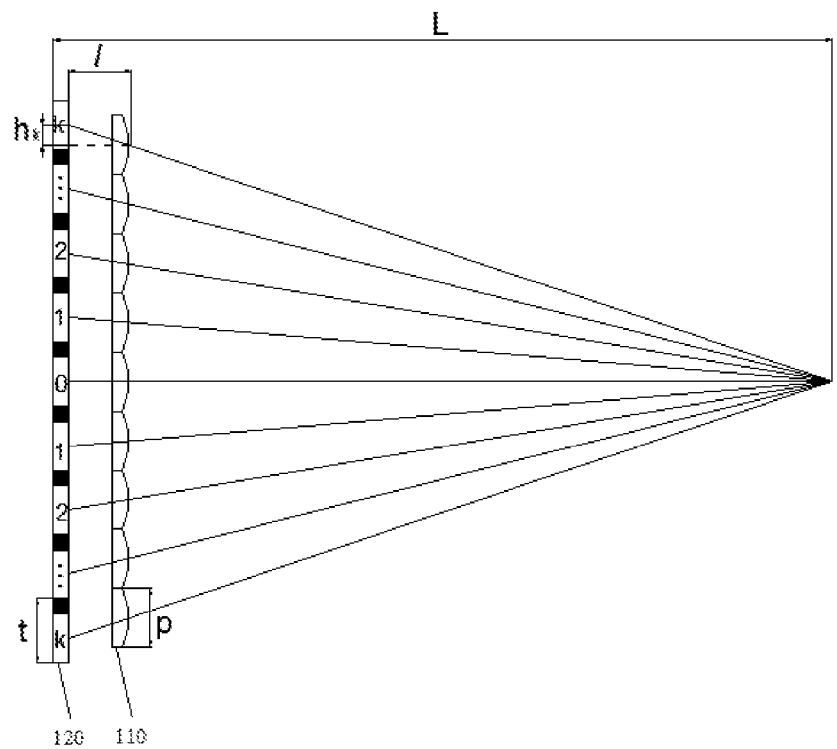
FIG. 9 is a schematic diagram illustrating an optical relationship between a pixel and a lens array in an illustrative arrangement of the present disclosure.
Figure 10:
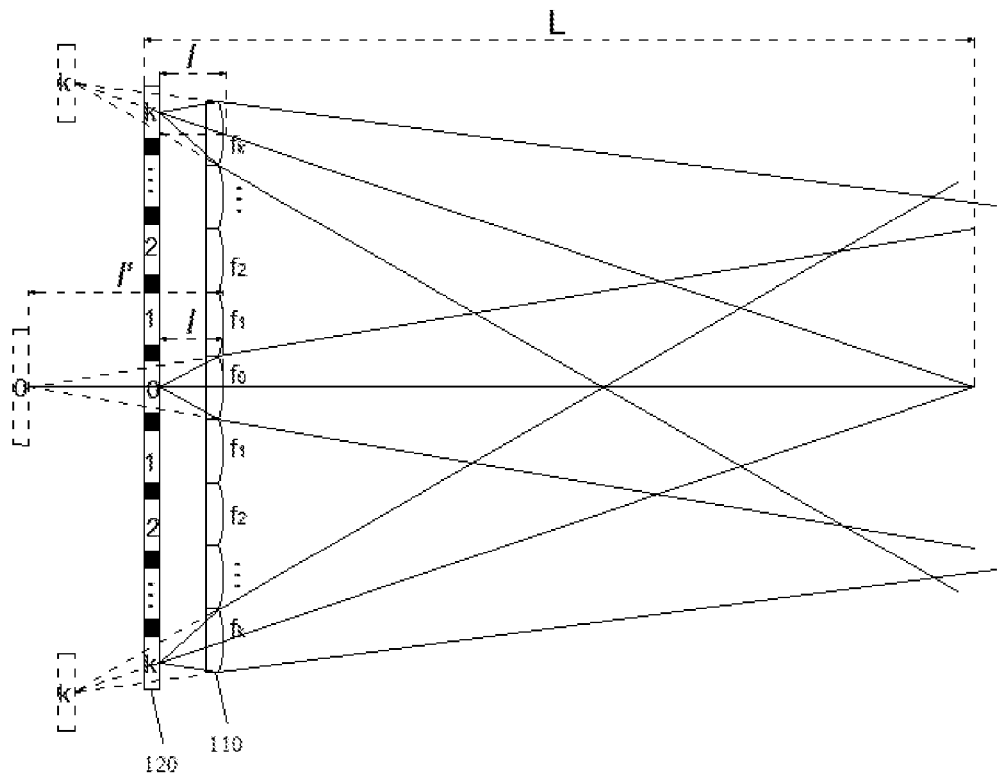
FIG. 10 is a schematic diagram illustrating another optical relationship between a pixel and a lens array in an illustrative arrangement of the present disclosure.

In the case where one sub-pixel is corresponding to one diffractive lens unit by way of example, as illustrated in FIGS. 9-10, based on a geometrical relationship, the following formulas can be obtained:

$$\frac{h_k}{l} = \frac{kt}{L}, \quad (8)$$

$$kt - kp = h_k, \quad (9)$$

and then it can be obtained that:

$$p = t \cdot \left(1 - \frac{l}{L}\right). \quad (10)$$

To sum up, the display mode controlling device 100 provided by the present arrangement can be combined with the display panel 120 so as to achieve switching between a planar display mode and a virtual curved display mode. When the display mode controlling device 100 functions as a diffractive lens array, an effect of virtual curved display can be achieved to enhance a visual effect as experienced; when the display mode controlling device 100 functions as a flat glass, a normal effect of planar display can be achieved.

Obviously, each of the schematic diagrams in the present solution shall be interpreted as a partial view of a corresponding arrangement without constituting any limitation to the present disclosure.

The present illustrative arrangement further provides a display device. Referring to FIG. 1, the display device includes the above-mentioned display mode controlling device 110, a display panel 120 and a control module. The control module is configured to power on the display mode controlling device 110 so that the display panel 120 presents a planar display mode and to power off the display mode controlling device 110 so that the display panel 120 presents a virtual curved display mode.

It should be explained that, specific details of the display device have been described with reference to the corresponding display mode controlling device, without repeating herein.

In the present illustrative arrangement, the display device can include any product or component having display function such as a mobile phone, a tablet computer, a television, a notebook computer, a digital photo frame and a navigator.

It should be noted that, although the description above mentions several modules or units for performing actions in the device, a division of these modules or units is not compulsory. Actually, according to the arrangements of the present disclosure, features and functions of two or more modules or units described above can be implemented in a single module or unit. On the other side, the feature(s) and function(s) of a single module or unit described above can be further divided to be implemented by multiple modules or units.

Additionally, although respective blocks of the method in the present disclosure are described in the drawings at specific orders, it's not intended to require or imply that these blocks have to be performed in such specific order or all the blocks have to be performed to obtain the desired result. Additionally or alternatively, some of the blocks may be omitted, some of the blocks may be combined into a single block for performing, and/or, one of the blocks may be split into several blocks for performing.

By considering the specification and upon implementing the disclosure herein, those skilled in the art can easily conceive of other arrangements of the present disclosure. The present disclosure is intended to cover all variations, purposes or adaptive modifications of the present disclosure, which should be in accordance with the general principle of the present disclosure and should encompass common knowledge or conventional technical means not disclosed in the present disclosure. The description and the arrangements are merely deemed as illustrative, and the true scope and spirit of the present disclosure are indicated by the appended claims.

What is claimed is:

1. A display mode controlling device for switching between a planar display mode and a virtual curved display mode of a display panel, comprising:
    a first substrate comprising a plurality of lens units arranged in an array, each of the plurality of lens units being provided with an annular diffractive phase grating;
    a second substrate aligned with the first substrate;
    a liquid crystal (LC) layer located between the first substrate and the second substrate; and
    a control electrode configured to generate a predetermined electric field to control a deflection state of a LC molecule,
    wherein the annular diffractive phase grating comprises N steps in which adjacent steps have a phase difference of $2\pi/N$, wherein $N=2^m$, and m is a positive integer.

2. The display mode controlling device according to claim 1, wherein each of the plurality of lens units is corresponding to one pixel region of the display panel.

3. The display mode controlling device according to claim 2, wherein focal distances of respective lens units corresponding to different pixel regions of the display panel are progressively increased from a center to an edge of the first substrate.

4. The display mode controlling device according to claim 1, wherein each of the plurality of lens units corresponding to one sub-pixel region of the display panel.

5. The display mode controlling device according to claim 4, wherein focal distances of respective ones of the plurality of lens units corresponding to different pixel regions of the display panel are progressively increased from a center to an edge of the first substrate, and
    focal distances of lens units corresponding to different sub-pixel regions of a same pixel region are the same.

6. The display mode controlling device according to claim 1, wherein under the virtual curved display mode, a trace of image distances of all the plurality of lens units is arranged in a curved surface.

7. The display mode controlling device according to claim 1, wherein the first substrate includes a base substrate, and
    the annular diffractive phase grating and the base substrate have an integrally formed structure.

8. The display mode controlling device according to claim 1, wherein each of the steps has a height $$h = \frac{\lambda/N}{n - n_o},$$

and each of the steps has a width $$t_j = \begin{cases} \dfrac{d_j}{N/2}, & (j \text{ is an even number}) \\ d_j - \sum_{i=1}^{m-1} \dfrac{d_{j+1}}{2^i}, & (j \text{ is an odd number}) \end{cases},$$

wherein $\lambda$ is a wavelength of emergent light of the display panel, n is a refractivity of the first substrate, $n_o$, is a minimum refractivity of the LC molecule with respect to the emergent light of the display panel, j is a number of Fresnel zone, d is a width of Fresnel zone, and i is a positive integer.

9. The display mode controlling device according to claim 1, wherein the LC molecule has a first refractivity with respect to emergent light of the display panel under a first deflection state and has a second refractivity with respect to the emergent light of the display panel under a second deflection state,
    wherein the first refractivity of the LC molecule is as same as a refractivity of the first substrate and is as same as a refractivity of the second substrate.

10. The display mode controlling device according to claim 9, wherein a direction of major axis of the LC molecule under an initial alignment is perpendicular to a polarization direction of the emergent light of the display panel; or, the direction of major axis of the LC molecule under the initial alignment is parallel to the polarization direction of the emergent light of the display panel.

11. The display mode controlling device according to claim 9, wherein the control electrode comprises a first electrode and a second electrode;
the first electrode and the second electrode both are disposed on the second substrate;
wherein the first electrode and the second electrode are located at different layers, the first electrode is a plate electrode and the second electrode is a strip electrode; or, the first electrode and the second electrode are located at a same layer, the first electrode and the second electrode both are strip electrodes and are disposed alternately.

12. A display device, comprising a display panel, a display mode controlling device, and a control module,
wherein the display mode controlling device is configured to switch between a planar display mode and a virtual curved display mode of a display panel, the display mode controlling device comprises:
a first substrate comprising a plurality of lens units arranged in an array, each of the plurality of lens units being provided with an annular diffractive phase grating;
a second substrate aligned with the first substrate;
a liquid crystal (LC) layer located between the first substrate and the second substrate; and
a control electrode configured to generate a predetermined electric field to control a deflection state of a LC molecule,
wherein the control module is configured to power on the display mode controlling device so as to allow the display panel to present the planar display mode, and to power off the display mode controlling device so as to allow the display panel to present the virtual curved display mode.

13. A display mode controlling method for switching a display mode of the display device according to claim 12, comprising:
by powering on the control electrode, allowing the LC molecule to be in a first deflection state so as to present the planar display mode;
by powering off the control electrode, allowing the LC molecule to be in a second deflection state so as to present the virtual curved display mode.

14. A display mode controlling device for switching between a planar display mode and a virtual curved display mode of a display panel, comprising:
a first substrate comprising a plurality of lens units arranged in an array, each of the plurality of lens units being provided with an annular diffractive phase grating;
a second substrate aligned with the first substrate;
a liquid crystal (LC) layer located between the first substrate and the second substrate; and
a control electrode configured to generate a predetermined electric field to control a deflection state of a LC molecule,
wherein the annular diffractive phase grating comprises N steps in which adjacent steps have a phase difference of $2\pi/N$, wherein $N=2^m$, and m is a positive integer; and
wherein each of the steps has a height $$h = \frac{\lambda/N}{n - n_o},$$

and each of the steps has a width $$t_j = \begin{cases} \dfrac{d_j}{N/2}, & (j \text{ is an even number}) \\ d_j - \sum_{i=1}^{m-1} \dfrac{d_{j+1}}{2^i}, & (j \text{ is an odd number}) \end{cases},$$

wherein $\lambda$ is a wavelength of emergent light of the display panel, n is a refractivity of the first substrate, $n_o$, is a minimum refractivity of the LC molecule with respect to the emergent light of the display panel, j is a number of Fresnel zone, d is a width of Fresnel zone, and i is a positive integer.

15. The display mode controlling device according to claim 14, wherein each of the plurality of lens units is corresponding to one pixel region of the display panel.

16. The display mode controlling device according to claim 15, wherein focal distances of respective lens units corresponding to different pixel regions of the display panel are progressively increased from a center to an edge of the first substrate.

17. The display mode controlling device according to claim 14, wherein each of the plurality of lens units corresponding to one sub-pixel region of the display panel.

18. The display mode controlling device according to claim 17, wherein focal distances of respective ones of the plurality of lens units corresponding to different pixel regions of the display panel are progressively increased from a center to an edge of the first substrate, and
focal distances of the plurality of lens units corresponding to different sub-pixel regions of a same pixel region are the same.

19. The display mode controlling device according to claim 14, wherein under the virtual curved display mode, a trace of image distances of all the plurality of lens units is arranged in a curved surface.

* * * * *